United States Patent [19]

Flank et al.

[11] Patent Number: 4,818,508

[45] Date of Patent: Apr. 4, 1989

[54] PROCESS FOR PREPARING MOLECULAR SIEVE BODIES

[75] Inventors: William H. Flank, Chappaqua; Walter P. Fethke, Jr., Monroe; Julio Marte, Peekskill, all of N.Y.

[73] Assignee: UOP, DesPlains, Ill.

[21] Appl. No.: 767,363

[22] Filed: Aug. 20, 1985

[51] Int. Cl.$^4$ .............................................. C01B 33/28
[52] U.S. Cl. ..................................... 423/328; 423/118
[58] Field of Search ....................... 423/118, 328, 329; 502/77, 80, 84, 503, 72; 501/141, 144, 147, 80, 81

[56] References Cited

U.S. PATENT DOCUMENTS

| | | | |
|---|---|---|---|
| 216,196 | 6/1879 | Lilley | 501/81 |
| 2,360,929 | 10/1944 | Blaha | 501/81 |
| 2,992,068 | 7/1961 | Haden, Jr. et al. | 423/118 |
| 3,009,776 | 11/1961 | Sensel | 423/118 |
| 3,065,054 | 7/1961 | Haden, Jr. et al. | 423/118 |
| 3,114,603 | 12/1963 | Howell | 423/118 |
| 3,119,659 | 1/1964 | Taggart et al. | 423/118 |
| 3,119,660 | 1/1964 | Howell et al. | 423/118 |
| 3,367,886 | 2/1968 | Haden, Jr. et al. | 502/68 |
| 3,367,887 | 2/1968 | Haden, Jr. et al. | 502/68 |
| 3,370,917 | 2/1968 | Eichhorn et al. | 423/118 |
| 3,390,212 | 6/1968 | Stelle | 501/81 |
| 3,450,645 | 6/1969 | McEvoy | 502/68 |
| 3,603,040 | 7/1986 | Kuznicki et al. | 423/328 Z |
| 3,777,006 | 12/1973 | Rundell et al. | 423/118 |
| 3,906,076 | 9/1975 | Goytisolo et al. | 423/118 |
| 4,058,586 | 11/1977 | Chi et al. | 423/118 |
| 4,235,753 | 11/1984 | Brown et al. | 502/68 |
| 4,256,845 | 3/1981 | Morris et al. | 264/49 |
| 4,343,723 | 8/1982 | Rogers et al. | 423/328 Z |
| 4,424,144 | 1/1984 | Pryor et al. | 502/68 |

*Primary Examiner*—John Doll
*Assistant Examiner*—R. Bruce Breneman
*Attorney, Agent, or Firm*—Norman L. Balmer

[57] ABSTRACT

A method is disclosed for preparing molecular sieves of the zeolite type, particularly A, X and Y, in massive bodies that exhibit higher crush strengths than observed for prior art massive bodies. Sized unreactive kaolin-type clay, a pore generating material, and preferably a set strength enhancing agent are mixed with water to a consistency that can be shaped into preformed bodies. In the cases of zeolites X and Y silica may be included in the mixture. These bodies are calcined, optionally aged, and digested to convert them to massive bodies containing the desired zeolite.

67 Claims, No Drawings

PROCESS FOR PREPARING MOLECULAR SIEVE BODIES

FIELD OF THE INVENTION

This invention relates to a process for producing synthetic molecular sieves of the zeolite type. More particularly, it relates to a process of producing these molecular sieves from preformed bodies such that the shape of the performed body is retained.

BACKGROUND OF THE INVENTION

The molecular sieves of interest to this invention are crystalline metal aluminosilicates having a general formula $$M_{2/n}O:Al_2O_3:xSiO_2:yH_2O$$

where values for x and y vary according to the crystalline structure of the particular zeolite. These materials consist basically of a rigid three-dimensional lattice of silica and alumina tetrahedra crosslinked through oxygen atoms. To the extent that the alumina and silica anions are not charge balanced, cations, represented by M in the above formula, occupy charged sites on the internal surface of the lattice. Typical cations include ammonium, protons, alkali metals, alkaline earth metals, transition metals and rare earth metals in oxidation states of one, two or three. Water molecules often occupy spaces between the tetrahedra unless the crystal has been dehydrated.

Many procedures for synthesizing zeolites produce materials that are very fine, often less than a few microns in size. The small particle size powders are difficult to use in many industrial processes. Furthermore the small sizes can also create dust hazards for people who handle the materials. Larger zeolite particles or so-called massive bodies, ranging in size from several microns to one fourth inch in their largest dimension, are clearly preferred in many applications. However, they must retain the ion-exchange properties, adsorption capacity and selectivity, thermal stability and catalytic activity of the finely divided crystalline zeolite. In addition, the particles should exhibit high attrition resistance and crush strength.

Larger bodies having sizes in excess of five microns can be prepared by agglomerating small crystals. A typical process requires a suitable binder, such as a clay or inorganic or organic adhesives, and processing conditions that assure reproducibility of the properties of the agglomerates. Because such processing conditions are often complex and difficult to control and because the binder material reduces the adsorptive and catalytic properties of the zeolite by dilution and other means, this approach is not optimal.

An alternative procedure for making particles whose largest dimension is as high as one fourth inch begins with the preparation of a precursor, or preformed body, which contains certain reactive or unreactive kaolin-type clays and which can be converted by chemical means to a zeolite body that retains the shape of the preformed body. However, the resulting massive bodies prepared by this method frequently, and often unpredictably, exhibit poor crush strength and/or adsorption properties. In addition, the wet strength of the preformed bodies made by prior art methods is generally quite low; the preferred bodies that are converted to zeolite often disintegrate during aging and digestion, especially if any agitation is used. As a result a substantial quantity of fine zeolite powder is usually formed. In addition, the rates of zeolite formation are generally slow, requiring at least one day in actual practice; most of the examples in the prior art methods require three days.

It is, therefore, a primary object of this invention to provide an improved process for producing molecular sieves in massive bodies whose zeolite content and crush strength are uniformly high and predictable.

It is additionally an object to provide a method of controlling the porosity of the preformed body in order to control and enhance the rate of zeolite formation.

It is a further object to provide preformed bodies whose wet strength is high.

DETAILED DESCRIPTION OF THE INVENTION

This invention is directed in its broadest aspect to a method of preparing molecular sieves of the zeolite type in massive bodies which comprises digesting in the presence of alkali metal oxide massive preformed or shaped bodies which contain reactive kaolin-type clay and which are prepared from particles of non-reactive kaolin-type clay in which at least fifty weight percent (50%) of the clay particles range in size from about 1.5 to about 15 microns, until said reactive kaolin-type clay is substantially converted to crystalline zeolite. Preferably the particle size distribution in the non-reactive kaolin-type clay will be such that at least fifty weight percent (50%) of the particles range in size from about two to about ten microns. Especially preferred reactive kaolin-type clays are metakaolin and metahalloysite.

More specifically this invention is directed to a method of preparing molecular sieves of the zeolite type, particularly of zeolites A, X and Y, in massive bodies, which comprises: (a) forming into massive preformed or shaped bodies and mixture comprising: (i) non-reactive kaolin-type clay in which at least fifty weight percent (50%) of the particles range in size from about 1.5 to about 15 microns; (ii) pore generating material in sufficient quantity to provide substantial porosity in the shaped bodies after thermal treatment; and (iii) water in sufficient quantity to provide plasticity; (b) thermally treating the shaped bodies at a temperature and for a time sufficient to: (i) convert the non-reactive kaolin-type clay to a reactive form; and (ii) generate substantial porosity in the shaped bodies by destroying substantially all of the pore generating material; and (c) digesting in the presence of aqueous alkali metal oxide the thermally treated shaped bodies until the reactive form of kaolin-type clay is substantially converted to crystalline zeolite.

This invention is also directed to a method of inducing porosity in preformed massive bodies by incorporating into the bodies a second type of pore generating material that dissolves out of the bodies during the digestion process. Pore generating materials of this type are not limited in their use to preformed materials using non-reactive kaolin-type clays in which at least fifty weight percent (50%) of the particles range in size from about 1.5 to about 15 microns.

a. Process Parameters

The process of this invention commences with mixing the kaolin-type clay and other dry ingredients, such as a pore generating material, with water to form a plastic mass, i.e., a thick paste. Water is added in an amount sufficient to permit formation of shaped bodies from the paste. For most shaping methods the clay content will range from about forty percent (40%) to about sixty percent (60%) by weight of the mixture. The water content will generally range from about 35% to about 45% by weight of the mixture, and preferably about 38% to about 42% by weight. The bodies may be shaped into many forms, for example, spheres, microspheres, pellets, beads, tablets, cylinders, disks, granules, cubes or blocks. Suitably shaping methods are conventional and include extruding, spray drying, prilling, molding, casting, slip-casting, tableting, briquetting, and bead forming processes such as tumbling, drum rolling, Nauta mixing and disk forming. The preferred methods are extrusion, spray drying, prilling and bead forming processes. Size may also be varied by controlling the composition of the mixture to be shaped and the method of shaping. Typical preform sizes range from about 1/64 to about ¼ in ch in diameter if the particle is approximately spherical or cylindrical in form. Smaller bodies, often as small as about sixty (60) to about seventy (70) microns in average diameter, result if they are shaped by some spray drying and prilling techniques.

Once shaped, the preformed bodies are ready for thermal treatment, also known as firing or calcination. Prior to this step, however, they may optionally be dried at a temperature of about 50° to about 150° C. for about ½–36 hours. In the interest of time and expense, however, calcination is generally done immediately after shaping. This process accomplishes two objectives: 1. the nonreactive kaolin-type clay is converted to a reactive form; and 2. the pore generating material is substantially destroyed. Thus the time and temperature of this step must be adjusted to accomplish both results in a controllable manner.

At temperatures of 500° C. to about 900° C. kaolin-type clays undero a structural rearrangement from a crystalline or pseudo-crystalline state to an amorphous state for which no X-ray diffraction pattern can be detected. It is this amorphous so-called "reactive" or "metakaolin" form that can expeditiously be converted by chemical means to a crystalline zeolite. The rate of conversion from non-reactive to reactive form is temperature dependent. At 550° C. it is slow, at 900° C. it is very rapid. At intermediate temperatures, preferably about 600° C. to about 750° C., the process is controllable and complete in thirty minutes to three hours, depending on the size and shape of the preformed bodies. The reactivity of the kaolin-type clay is retained if the fired bodies are stored for extended periods of time prior to the subsequent digestion step.

The conversion from reactive kaolin-type clay to zeolite is accomplished by chemical treatment of the final bodies in an aqueous alkaline reaction medium. The type of zeolite that is formed is determined by the composition of the overall reaction mixture, including the reactive ingredients in the fired preformed bodies, used for the treatment. By conventional the formulation is expressed in terms of moles of oxide as follows:

$M_2O/SiO_2 = a$ $SiO_2/Al_2O_3 = b$ $H_2O/M_2O = c$ where the values of a, b and c are determined by the particular type of zeolite to be made and M is at least one cation as described previously. Approximate values of a, b and c which produce optimal conversions to zeolites A, X and Y in their sodium form are shown in Table 1.

TABLE 1

| Zeolite | Approximate Reaction Composition Coefficients | | |
|---|---|---|---|
| | a | b | c |
| A | 0.5–1.5 | 1.6–2.2 | 10–100 |
| X | 0.8–1.5 | 2.5–5 | 25–60 |
| Y | 0.3–0.6 | 6–9 | 35–50 |

After determining the moisture, alumina and silica contents of the fired kaolin-type clay bodies, sufficient alumina, silica and/or caustic are added to the reaction medium to achieve the desired ratios. If additional alumina is required, an alumina source, such as alumina trihydrate, activated alumina or alkali metal aluminate, is used. To raise the silica level for the silica-rich zeolites such as zeolites X and Y, a silica source, such as colloidal silica sol, silicic acid, alkali metal silicate, silica gel, or reactive particulate silica, should be added, either to the mixture to be shaped, to the alkaline reaction medium, or to both. The level of metal M is usually adjusted by adding it as its hydroxide compound to the alkaline reaction medium.

The conversion to crystalline zeolite may be done in one or two steps. If a two-step process is used, the reaction mixture is maintained at a temperature of from about 10° C. to about 70° C. for two to as many as twenty-four hours. After this preliminary so-called "aging" step, the temperature of the mixture is raised to a temperature of from about 80° C. to about 120° C. and preferably about 90° C. to about 110° C. for the so-called "digestion" step. In some instances the composition of the medium could be changed at this point, for example, by adding more hydroxide compound or silica source. The actual digestion or crystallization is allowed to proceed until substantially all of the reactive kaolin-type clay has been converted to a crystalline zeolite. Depending on temperature, composition of the reaction mixture, and degree of agitation, the conversion will usually be complete in under thirty hours. Digestions of three to five hours are typical in many cases. In a one-step process the aging step is eliminated and the temperature is immediately raised to approximately 90° C. to 110° C. Agitation may sometimes be useful to speed the process; however, crystallinity and attrition resistance of the product should be carefully considered in deciding whether to agitate.

The zeolite bodies are recovered from the digestion medium, conveniently by screening or sluicing, and washed. The bodies are then dried under circulating air, usually in an oven at a temperature of from 25° C. to 150° C. for several hours.

After this drying step the product may be analyzed chemically and by X-ray diffraction. If adsorption characterization is desired, the zeolite bodies must be dehydrated by heating at even higher temperatures and preferably at reduced pressures. Good results have been observed if the bodies are heated at about 300° C. to about 400° C. at a pressure of 0.1 mm Hg or less. Water and oxygen adsorption parameters can then be determined using McBain-Bakr adsorption equipment.

The zeolite bodies that are prepared by the process of this invention may be readily ion-exchanged to replace all or part of the original cations in the zeolite body with other cations to modify certain properties, such as adsorption selectivity, catalytic activity and ion-exchange specificity. The ion-exchange can be accomplished by methods such as batch or continuous exchange using, for example, dilute solutions (about 1M) of halide salts of the exchanging ion.

This summary of the process is intended to guide one in the practice of this invention. Some changes and modifications may be possible without losing any or all of the benefits and without deviating from the spirit and scope of the invention.

b. Clay

A kaolin-type clay is one which has the following general formula, $$Al_2O_3 \cdot 2SiO_2 \cdot 2-4H_2O$$

and which, when in an amorphous reactive form, can be converted to a crystalline aluminosilicate molecular sieve of the zeolite type. The kaolin-type clays preferred for the practice of this invention are kaolinite and halloysite. Such clays are produced in granular forms consisting of primary mineral particles, which are fractions of a micron to a few microns in size, and aggregated particles, which may be ten to hundreds of microns in size. Aggregated particles may be ground to primary particles or to smaller aggregates under 100 microns in size by conventional techniques. Primary or ground particles having a large particle size distribution may be sized by a variety of techniques, e.g., screening and elutriation, into fractions having much narrower distributions.

According to prior art methods of preparing zeolites from preformed bodies in the absence of added zeolite powders, unreactive kaolin-type clay particles may range in size from 0.1 micron to 50 or 75 microns. (See U.S. Pat. Nos. 3,119,659 and 3,119,660.) However, if such unsized clays are used, the resulting zeolite bodies exhibit relatively weak and variable crush strengths (as will be discussed later), the rates of conversion of clay to zeolite are generally slow and unpredictable, and the extent of conversion is often irreproducible. These effects are though to arise because the fine particles contained in the unsized clay can clog the pores and cavities within and between the larger particles comprising the preformed body and because the process conditions needed for rapid and extensive conversion of the clay to zeolite in the relatively non-porous preformed bodies are severe. The weak and variable crush strengths of products prepared by prior art methods presumably arise because the large cavities randomly distributed within and between the clay particles, especially the larger particles, are retained in the preformed bodies and weaken the final crystallized product structure.

Some of these difficulties can be reduced by mixing a substantial quantity of previously prepared zeolite crystals or reactive kaolin-type clay with the non-reactive kaolin-type clay prior to shaping. These approaches are expensive solutions to the problem because as much as half of the digestion mixture might be pre-made zeolite or reactive kaolin; thus more processing steps are required to prepare the added ingredient and to mix it with the unreactive clay subsequently being converted to zeolite. Although these additives may be included in amounts ranging as high as about forty percent (40%) by weight of the mixture to be shaped in the practice of this invention, such materials are not necessary or preferred. As a result this invention can be practices much less expensively and much more rapidly than the prior art procedures.

We have discovered that the rate of zeolite formation in massive bodies can be reproducibly accelerated and the purity of that zeolite enhanced by controlling the size of the particles of non-reactive kaolin-type clay used to make the preformed bodies, hence limiting the size of internal pores and cavities to the sizes of those found in particles no larger than about fifteen microns, and preferably about ten microns. The effects of particle size on a number of parameters have been examined in detail in two sets of experiments investigating the preparation of zeolite A. In the first group the conversion of reactive metakaolin powder to zeolite powder was studied. For these experiments a mixture of a coarse kaolinite clay (Hydrite MP) and a fine clay (Hydrite R, both obtained from Georgia Kaolin Company) was separated into four fractions by air elutriation: 1-3 microns; 3-6 microns; 6-10 microns; and greater than 10 microns. Each fraction was fired for two hours at 650° C., and weighed quantities were placed in one of two caustic solutions to evaluate the effect of high and low caustic levels. Final compositions, including the added clay, were $1.93Na_2O:1.90SiO_2:66.3H_2O:Al_2O_3$ and $2.27Na_2O:1.90SiO_2:66.3H_2O:Al_2O_3$. The mixtures were aged at room temperature for either five or sixteen hours and then digested quiescently at 100° C. Samples of product were withdrawn after one, two, three and six hours of digestion, washed, dried and characterized by X-ray powder diffraction. The amount of zeolite A and impurity zeolite C are shown in Tables 2A and 2B as functions of a number of reaction parameters.

The following conclusions can be drawn from these results. As particle size decreases, the conversion to zeolite A increases. The conversion increases slightly if the age time increases from five to sixteen hours. Increased caustic level leads to increased amount of zeolite C impurity, especially at shorter age time. The formation of zeolite C is generally enhanced by shorter aging times and larger particle sizes. A balancing of aging and digestion times and caustic level and the use of particle sizes ranging from about three to about ten microns will produce a relatively high yield of zeolite A powder with lower zeolite C impurity.

TABLE 2A

| Clay Fraction size (microns) | Effect of Particle Size on Zeolite A Yield and Purity in Powders (Digestion Formulation: 1.93 Na$_2$O:1.90 SiO$_2$:66.3 H$_2$O:Al$_2$O$_3$) | | | | | |
|---|---|---|---|---|---|---|
| | Age RT 5 hrs Digest 100° C. (hours) | Yield (%) | | Age RT 16 hrs Digest 100° C. (hours) | Yield (%) | |
| | | Zeolite A | Zeolite C | | Zeolite A | Zeolite C |
| 1-3 | 1 | 5 | 0 | 1 | 20 | 0 |
| | 2 | 92 | 0 | 2 | 92 | 0 |
| | 3 | 90 | 0 | 3 | 89 | 0 |
| | 6 | 80 | 0 | 6 | 87 | 1 |
| 3-6 | 1 | 0 | 0 | 1 | 0 | 0 |
| | 2 | 73 | 0 | 2 | 68 | 0 |

TABLE 2A-continued

Effect of Particle Size on Zeolite A Yield and Purity in Powders
(Digestion Formulation: 1.93 Na$_2$O:1.90 SiO$_2$:66.3 H$_2$O:Al$_2$O$_3$)

| Clay Fraction size (microns) | Age RT 5 hrs Digest 100° C. (hours) | Yield (%) Zeolite A | Yield (%) Zeolite C | Age RT 16 hrs Digest 100° C. (hours) | Yield (%) Zeolite A | Yield (%) Zeolite C |
| --- | --- | --- | --- | --- | --- | --- |
|       | 3 | 79 | 1 | 3 | 86 | 1 |
|       | 6 | 81 | 2 | 6 | 86 | 2 |
| 6–10  | 1 | 0  | 0 | 1 | 0  | 0 |
|       | 2 | 51 | 0 | 2 | 74 | 0 |
|       | 3 | 72 | 2 | 3 | 78 | 0 |
|       | 6 | 78 | 3 | 6 | 80 | 1 |
| >10   | 1 | 0  | 0 | 1 | 0  | 0 |
|       | 2 | 47 | 0 | 2 | 67 | 0 |
|       | 3 | 73 | 1 | 3 | 73 | 1 |
|       | 6 | 76 | 2 | 6 | 81 | 1 |

TABLE 2B

Effect of Particle Size on Zeolite A Yield and Purity in Powders
(Caustic Enriched Formulation: 2.27 Na$_2$O:1.90 SiO$_2$:66.3 H$_2$O:Al$_2$O$_3$)

| Clay Fraction size (microns) | Age RT 5 hrs Digest 100° C. (hours) | Yield (%) Zeolite A | Yield (%) Zeolite C | Age RT 16 hrs Digest 100° C. (hours) | Yield (%) Zeolite A | Yield (%) Zeolite C |
| --- | --- | --- | --- | --- | --- | --- |
| 1–3  | 1 | 7  | 0 | 1 | 0  | 0 |
|      | 2 | 88 | 0 | 2 | 78 | 0 |
|      | 3 | 81 | 0 | 3 | 93 | 0 |
|      | 6 | 92 | 0 | 6 | 87 | 0 |
| 3–6  | 1 | 0  | 0 | 1 | 0  | 0 |
|      | 2 | 74 | 2 | 2 | 82 | 1 |
|      | 3 | 72 | 2 | 3 | 67 | 1 |
|      | 6 | 60 | 3 | 6 | 83 | 1 |
| 6–10 | 1 | 0  | 0 | 1 | 6  | 0 |
|      | 2 | 69 | 2 | 2 | 80 | 2 |
|      | 3 | 61 | 3 | 3 | 78 | 1 |
|      | 6 | 73 | 5 | 6 | 72 | 2 |
| >10  | 1 | 0  | 0 | 1 | 15 | 0 |
|      | 2 | 67 | 3 | 2 | 74 | 1 |
|      | 3 | 61 | 5 | 3 | 70 | 1 |
|      | 6 | 69 | 6 | 6 | 82 | 2 |

In a second, more informative group of experiments, preformed bodies, prepared by extruding into pellets of ⅛ inch diameter mixtures containing nonreactive kaolinite particles which had been separated into four fractions as described previously, were converted to zeolite A bodies. Again the mixtures contained Hydrite MP and Hydrite R clays. In this case, however, two additional ingredients were incorporated into the mixture to be extruded—a wet strength enhancing agent (Attagel-50, 5% by weight of the kaolinite) and a pore generating material (Solka-Floc, 6% by weight of the dry ingredients). The purposes and properties of these materials will be discussed in later sections. For the present discussion, suffice it to say that the wet strength enhancing agent serves to keep the particles intact during the digestion process, and the pore generating material is used to improve the particle porosity in a controllable manner. The final mixture was blended with water until the resulting paste could be extruded into ⅛ inch diameter bodies. After overnight drying at 100° C., the bodies were fired at 650° C. for two hours. They were then placed in an aging-digesting medium having the final compositions (including the alumina and silica in the kaolinite but not in the unreactive Attagel wet strength enhancing agent): 1.93Na$_2$O:1.90SiO$_2$:66.3H$_2$O:Al$_2$O$_3$ and 2.27Na$_2$O:1.90SiO$_2$:66.3H$_2$O:Al$_2$O$_3$. Aging time was either five or sixteen hours. Digestion was carried out quiescently at 100° C. for up to twenty-four hours. Crystallized product was periodically withdrawn, washed, dried and characterized by X-ray powder diffraction. The yields of zeolites A and C are summarized in Tables 3A and 3B.

The observation of greatest interest to this invention is the determination that the rate of formation of zeolite A bodies is slowest for those preforms made from clay containing kaolinite particles in the size range of one to three microns. This result is independent of aging time and caustic concentration. It should also be noted that, in the absence of added caustic, the rate of formation of zeolite A decreases as the kaolinite particle size increases beyond six microns (Table 3A). If more caustic is added, the rate of formation of zeolite A from the preforms containing larger kaolinite particles is independent of particle size (Table 3B).

The amount of impurity zeolite C in the final bodies also varied with caustic level and the particle size of the kaolinite used to prepare the preforms. With a five hour age time and more caustic, conversion to zeolite C increased as the particle size of the kaolinite increased (Table 3B). In general, higher amounts of zeolite C were observed when the age time was shorter or the digest time longer.

It is clear from these results that the rate of formation of zeolite A from preformed bodies can be controlled by varying the size of kaolinite particles used to prepare the preforms.

TABLE 3A

Effect of Particle Size on Zeolite A Yield and Purity in Bodies
(Digestion Formulation: 1.93 $Na_2O$:1.90 $SiO_2$:66.3 $H_2O$:$Al_2O_3$)

| Clay Fraction size (microns) | Age RT 5 hrs Digest 100° C. (hours) | Yield (%) Zeolite A | Yield (%) Zeolite C | Age RT 16 hrs Digest 100° C. (hours) | Yield (%) Zeolite A | Yield (%) Zeolite C |
|---|---|---|---|---|---|---|
| 1-3 | 1 | 0 | 0 | 1 | 0 | 0 |
|  | 2 | 29 | 0 | 2 | 31 | 0 |
|  | 3 | 47 | 0 | 3 | 53 | 0 |
|  | 6 | 50 | 0 | 6 | 60 | 0 |
|  | 24 | 67 | 2 | 24 | 60 | 0 |
| 3-6 | 1 | 51 | 0 | 1 | 44 | 0 |
|  | 2 | 49 | 0 | 2 | 64 | 0 |
|  | 3 | 68 | 2 | 3 | 69 | 0 |
|  | 6 | 65 | 2 | 6 | 71 | 0 |
|  | 24 | 63 | 3 | 24 | 67 | 2 |
| 6-10 | 1 | 11 | 0 | 1 | 12 | 0 |
|  | 2 | 55 | 0 | 2 | 57 | 0 |
|  | 3 | 57 | 0 | 3 | 61 | 2 |
|  | 6 | 66 | 1 | 6 | 62 | 0 |
|  | 24 | 56 | 0 | 24 | 63 | 0 |
| >10 | 1 | 13 | 0 | 1 | 25 | 0 |
|  | 2 | 40 | 0 | 2 | 60 | 0 |
|  | 3 | 66 | 1 | 3 | 51 | 0 |
|  | 6 | 48 | 1 | 6 | 63 | 0 |
|  | 24 | 75 | 2 | 24 | 62 | 2 |

TABLE 3B

Effect of Particle Size on Zeolite A Yield and Purity in Bodies
(Enriched Caustic Digestion Formulation: 2.27 $Na_2O$:1.90 $SiO_2$:66.3 $H_2O$:$Al_2O_3$)

| Clay Fraction size (microns) | Age RT 5 hrs Digest 100° C. (hours) | Yield (%) Zeolite A | Yield (%) Zeolite C | Age RT 16 hrs Digest 100° C. (hours) | Yield (%) Zeolite A | Yield (%) Zeolite C |
|---|---|---|---|---|---|---|
| 1-3 | 1 | 30 | 1 | 1 | 10 | 0 |
|  | 2 | 40 | 2 | 2 | 46 | 0 |
|  | 3 | 42 | 2 | 3 | 45 | 0 |
|  | 6 | 49 | 2 | 6 | 61 | 1 |
|  | 24 | 57 | 3 | 24 | 67 | 1 |
| 3-6 | 1 | 53 | 3 | 1 | 50 | 0 |
|  | 2 | 50 | 4 | 2 | 69 | 1 |
|  | 3 | 58 | 5 | 3 | 62 | 2 |
|  | 6 | 56 | 5 | 6 | 74 | 2 |
|  | 24 | 64 | 7 | 24 | 71 | 2 |
| 6-10 | 1 | 50 | 3 | 1 | 47 | 0 |
|  | 2 | 47 | 4 | 2 | 62 | 1 |
|  | 3 | 54 | 4 | 3 | 61 | 1 |
|  | 6 | 45 | 5 | 6 | 65 | 1 |
|  | 24 | 61 | 6 | 24 | 58 | 2 |
| >10 | 1 | 51 | 4 | 1 | 54 | 0 |
|  | 2 | 56 | 6 | 2 | 58 | 1 |
|  | 3 | 53 | 6 | 3 | 57 | 1 |
|  | 6 | 59 | 5 | 6 | 59 | 2 |
|  | 24 | 52 | 7 | 24 | 63 | 2 |

A higher rate is obtained if the particles range in size from about three to about ten microns. This range can be extended to larger particles if the digestion mixture is enriched in caustic so that the $Na_2O$: $Al_2O_3$ ratio is above about 2.1. However, it should be noted that when a higher caustic level is used, a longer aging period is required to reduce the amount of impurity zeolite C.

Molecular sieve bodies prepared according to the process of this invention exhibit crush strengths that are substantially higher than those of products prepared by prior art methods using unsized clays, i.e., clays having a spectrum of particle sizes from less than one micron to as high as fifty microns. Crush strengths can be determined by placing several molecular sieve bodies on a horizontal even surface, lowering a horizontally oriented mechanical piece, having an even face parallel to the lower surface, onto the molecular sieve bodies, applying force to those bodies and monitoring the force by a detector device. When the bodies collapse under the pressure there is a drop in the force being monitored. The maximum value detected prior to the drop is the crush strength of those bodies. Values are typically recorded as averages of several measurements. Crush strengths for bodies prepared from extrudates containing fifty percent (50%) by weight unsized non-reactive kaolin-type clay and fifty percent (50%) by weight zeolite A prepared by the method of U.S. Pat. No. 3,119,660 are typically about 15 lbs. of force. The corresponding values for NaA bodies prepared according to the process of this invention are approximately 30-35 lbs. of force. That is, bodies prepared by this novel process exhibit a crush strength at least twice as large as that observed for the strongest bodies prepared by prior art methods.

In evaluating particular kaolin-type clays for their utility in the practice of this invention, one should consider those clays having a median particle size of from about three to about eight microns and a particle size distribution such that at least fifty weight percent (50%) of the particles range in size from about 1.5 to about 15 microns. A preferred kaolin-type clay is one in which at least fifty percent (50%) of the particles are between about two and about ten microns. Useful commercial kaolinites include Hydrite MP (formerly available from Georgia Kaolin Company), Hydrite Flat D (available from Georgia Kaolin Company), EPK (available from NL Industries), and Gordon 50 and Al-Sil-Ate LO clays (available from Freeport Kaolin Co., acquired by Englehard Corp.). However, any kaolin-type clay or clay mixture that can be converted to a zeolite and that has a particle size distribution meeting the above description can be used.

In preparing the mixture to be shaped one should use an amount of clay that is approximately sixty percent (60%) to about ninety-five percent (95%) by weight of the dry ingredients used. Weights of from about seventy percent (70%) to about ninety percent (90%) are preferred in most cases.

c. Pore Generating Material

The preformed body of kaolin-type clay is permeated with a network of pores and cavities. During the digestion process the caustic and other reagents diffuse into these pores. The porosity of the fired bodies correlates with particle size of the clay used to make the preforms (Table 4). As the particle size of the clay increases, the mode value for the port diameters in the fired extrudate also increases. A larger particle size clay typically yields bodies that contain larger pores that permit better access to the reactants in the aging and digesting processes.

TABLE 4

Porosity Parameters for Fired Bodies vs. Particle Size

| Clay Fraction Size (microns) | Pore Volume* (cc/g) | Pore Diameter Mode Value (microns) |
|---|---|---|
| 1-3 | 0.446 | 0.3 |
| 3-6 | 0.533 | 1.1 |
| 6-10 | 0.548 | 1.4 |
| >10 | 0.522 | 2.7 |
| Extrudate Formulation: | | 89.6% Hydrite MP 4.7% Attagel-50 5.7% Solka-Floc |

*Measured by Hg porosimetry.

It is well known that the porosity of bodies prepared from kaolin-type clay can be increased by the addition of a pore generating material, denominted a "diluent" in U.S. Pat. No. 3,119,660, to the clay mixture that is to be shaped into performed bodies. This material is generally one which is substantially destroyed in the firing process that converts the kaolin-type clay to a reactive form, the destruction occurring in a manner that produces a network of pores and small cavities in the fired bodies. We have also discovered that some materials, denominated as pore generating materials of the second type, dissolve in the caustic digestion medium, thereby enhancing the pore network in the particle being digested. Representative pore generating materials of the first type include sawdust, powdered carbon, coke, lampblack, cellulose products (e.g., methyl or ethyl cellulose and the commercially available Solka-Floc pure cellulose, Dicalite Div., Grefco, Inc., N.Y., N.Y.), starches, (e.g., wood flour and wheat flour), hydrocarbon polymer fibers (e.g., polyethylene) and polymeric materials containing hydrogen, carbon and oxygen (e.g., ethylene oxide polymers). Representative pore generating materials of the second type are water soluble materials, especially those retaining water solubility after the thermal or calcination step. Especially useful are water soluble salts, such as the water-soluble carbonate, bicarbonate, phosphate, chloride, nitrate, sulfate and acetate salts of alkali metals, akaline earths, transition metals, rare earth metals, ammonium and aluminum. Combinations of such materials may also be used. Preferably the pore generating material will be provided in a fine form no larger than about 149 microns, that is, one which will pass through a 100 mesh U.S. Sieve screen.

The pore generating materials is intimately mixed with the kaolin-type clay to form a substantially homogeneous mixture which is then blended with $H_2O$ into the paste to be shaped. While mixtures containing as much as fifty percent (50%) by weight pore generator may be converted to zeolite, satisfactory conversions may be obtained with concentrations ranging from about one to about twenty-five percent by weight, relative to clay. A satisfactory conversion is one which produces a strong molecular sieve in a relatively short period of time, preferably in less than thirty hours. Any amount of pore generator that achieves this result is suitable in the practice of this invention. For zeolite A preferred levels of pore generating material range from about two percent (2%) to about fifteen percent (15%) by weight of dry ingredients. As shown in Table 5, conversions to zeolite A of between 75 and 90% are obtained from preforms containing from about ten percent (10%) to about fourteen percent (14%) by weight of pore generating material of the first type. Preferred levels for zeolites X and Y are from about three percent (3%) to about twenty percent (20%) by weight dry ingredients. In general, concentrations of about five percent (5%) to about twelve percent (12%) are especially preferred because the final zeolite particles have a higher particle density. Thus, the zeolite body is both stronger and denser.

The bore volume may be correlated with the piece or particle density of fired zeolite bodies when the pore generating material is of the first type. The "piece density" is the ratio of particle weight to particle volume. The particle volume is determined by mercury displacement of a weighed quantity of particles.

TABLE 5

Effect of Amount of Type One Pore Generator on Zeolite A Conversion

| Amount of Pore Generator (%) | Digestion Time (hours) | Yield Zeolite A (%) | |
|---|---|---|---|
| | | by X-Ray Diffraction | by $O_2$ Adsorption |
| 10 | 8 | | 86.2 |
| 10 | 24 | | 82.4 |
| 10 | 24 | | 78.4 |
| 14 | 8 | 82.8 | 84.1 |
| 14 | 24 | | 79.9 |

Experimental Parameters Formulation for Shaping

| Dry Ingredient | Amount Pore Generator | |
|---|---|---|
| | 10% | 14% |
| Hydrite MP | 85.7% | 82.0% |
| Attagel-50 | 4.5% | 4.3% |
| Solka-Floc | 5.3% | 5.1% |
| Sawdust | 4.5% | 8.6% |

Firing Procedure:
650° C., 1 hr
Formulation for Oven Digestion:
2.27 $Na_2O$:1.90 $SiO_2$:66.3 $H_2O$:$Al_2O_3$ The data shown in Table 6 demonstrate that the piece density of preformed bodies decreases as the weight percent of pore generating material increases. A dry mixture containing 95% by weight Hydrite MP clay and 5% by weight wet strength enhancer (Attagel-50) was mixed with pore generating material (Solka-Floc) to form dry mixtures containing either three percent (3%) or six percent (6%) by weight pore generator. These mixtures were than blended with water until the pastes could be shaped into Nauta-formed beads, accretion beads and ⅛ inch extrudates. The preformed bodies were then fired at either 650° C. or 750° C. The piece density was determined for each sample. In all cases the samples containing the lower amount of pore generating material exhibited a higher piece density. It was also observed that the piece density of the Nauta-formed beads was higher than the values observed for accretion beads and extrudates. This is consistent with the result that the porosity of fired Nauta-formed beads is significantly lower than that of fired extruded bodies, irrespective of firing temperature and amount of pore generator in the preform.

TABLE 6

Piece Density and Porosity of Fired Bodies

| Body Shape | Amount Pore Generator (%) | Firing Temp. (°C.) | Piece Density (g/cc) | Pore Volume (cc/g) | Mode Value of Pore Diameters (microns) |
|---|---|---|---|---|---|
| Nauta beads | 3 | 650 | 1.529 | .274 | .2 |
|  |  | 750 | 1.538 | .287 | .1 |
|  | 6 | 650 | 1.494 | .272 | .2 |
|  |  | 750 | 1.494 | .304 | .1 |
| Accretion beads | 3 | 650 | 1.295 |  |  |
|  |  | 750 | 1.293 |  |  |
|  | 6 | 650 | 1.243 |  |  |
|  |  | 750 | 1.235 |  |  |
| Extrudates (⅛ inch) | 3 | 650 | 1.303 | .414 | .6 |
|  |  | 750 | 1.321 | .433 | 1.0 |
|  | 6 | 650 | 1.246 | .429 | .6 |
|  |  | 750 | 1.266 | .446 | 1.0 |

Actual Dry Ingredient Formulations

| | | | |
|---|---|---|---|
| Solka Floc | 2.9% | 5.7% |  |
| Hydrite MP | 92.2 | 89.6 | (anhydrous basis) |
| Attagel-50 | 4.9 | 4.7 |  |

When kaolinite extrudates having different piece densities are treated with caustic to convert them to zeolite A, the extent of conversion decreases as the piece density increases. Even extended digestion at 90°-110° C. does not improve the conversion (Table 7). These results demonstrate that if the piece density of the thermally treated shaped bodies ranges in value from about 1.0 to about 1.3 g/cc, conversions to zeolite of 70% or more are easily and uniformly obtained with less than 25 hours of aging and digestion. If the value is smaller, the resulting bodies exhibit poor crush strength. If the value is higer, the conversion of clay to zeolite is very slow. Especially satisfactory bodies of zeolite A having good particle strength have been obtained using fired preformed bodies whose piece densities range from about 1.05 to about 1.25 g/cc, using age times of from about three to about twenty hours and digestion times of no longer than eight hours. Piece density can usually be further adjusted by varying the moisture level in the mixture to be shaped. If the moisture level is less than about 35% by weight, piece densities greater than 1.25 g/cc often result; in addition, the preformed bodies are often weak. Moisture levels of about 35% to 45%, and preferably from about 38% to about 42%, are desirable in order to obtain a suitable piece density and still permit the mixture to be shaped into coherent bodies. An alternative, or sometimes additional, adjustment may be made in the amount of pore generating material.

TABLE 7

Effect of Piece Density on Zeolite A Yield

| Piece Density of Preforms (g/cc) | Age Conditions | | Digest Conditions | | Yield of Zeolite A (by $O_2$) Adsorption) |
|---|---|---|---|---|---|
|  | Temp. (°C.) | Time (hours) | Temp. (°C.) | Time (hours) |  |
| 1.78 | — | — | 90–110 | 20 | 20 |
| 1.61 | — | — | 90–110 | 20 | 53 |
| 1.26 | 22 | 16.5 | 97–98 | 8 | 84.8 |
| 1.20 | 22 | 16.5 | 93 | 6 | 88.5 |
| 1.18 | 67–57 | 4 | 90 | 7.5 | 90.7 |
| 1.10 | 22 | 16.5 | 95 | 6 | 80.5 |

Extrusion Mixture: 89.6% Hydrite Flat D
4.7 Attagel-50
5.7 Wheat Flour (Gold Medal All Purpose)
Age/Digest Formulation: 1.93 $Na_2O$:1.90 $SiO_2$:66.3 $H_2O$:$Al_2O_3$ If the amount of that additive is increased, piece density may be decreased.

In preparing silica-rich molecular sieve bodies of zeolites X and Y from kaolin preforms, questions arise as to when the additional silica should be introduced into the process-during preparation of the matrix to be shaped or during the digestion step-and what effect that addition will have on porosity. The form of the silica added to a matrix of clay, pore generating agent and wet strength enhancing agent to be shaped affects the porosity and pore size of the preformed body that results after firing (Table 8). If a water soluble silicate (e.g. $Na_2SiO_3$) or colloidal silica (e.g., Ludox LS) is added to the preform mixture, the pore volume of ⅛ inch extruded and fired particles is quite low. When a solid silica (e.g., Hi-Sil 233 or diatomaceous earth) is added, however, the pore volume is substantially increased. In addition, the colloidal and reactive particulate silicas create bimodal pore size distributions; that is, the fired bodies contain two groups of pores having substantially different sizes.

TABLE 8

Effect of Added Silica Form on Porosity

| Form of Silica | Pore Volume (cc/g) | Pore Diameter Mode Values (microns) |
|---|---|---|
| Na$_2$SiO$_3$ (Grade 40) | 0.210 | 0.9 |
| Colloidal Silica (Ludox LS) | 0.263 | 0.009, 0.35 |
| Fine-particle solid silica (Hi-Sil 233) | 0.576 | 0.035, 0.55 |
| Large-particle solid silica (Snow Floss diatomaceous earth) | 0.579 | 0.15, 0.9 |

Conversion of the various silica-rich preforms to zeolites X and Y reflects the degree of porosity in the preforms caused by the silica source (Tables 9a and 9b). When the silica source is sodium silicate and it is entirely or primarily incorporated into the preformed bodies, the preforms are low in porosity and the conversion to zeolite X is poor; traces of impurity zeolite A are apparent. If the silicate is incorporated into the digestion medium, however, some conversion to zeolite X is observed, although the extents of conversion are poor. The extent of conversion increases as the amount of silicate increases, i.e., as the SiO$_2$/Al$_2$O$_3$ ratio increases. Poor conversions to zeolite are also observed if a colloidal silica, such as Ludox LS, is incorporated into the bodies. Better yields of zeolite X are obtained if a fine-particle silica, such as Hi-Sil 233, or a diatomaceous earth, such as Snow Floss (available from Johns Manville Corp.), is incorporated into the preformed bodies (Table 9a).

When a solid or colloidal silica is incorporated into the preformed bodies and Na$_2$SiO$_3$ into the digestion mixture, conversions are increased substantially. Those yields are proportional to the particle size of the silica in the bodies and the amount of Na$_2$SiO$_3$ in the digestion mixture. It is clear that the use of a solid silica source containing relatively large particles and incorporation of Na$_2$SiO$_3$ into the aqueous digestion medium can lead to significantly improved yield of zeolite.

TABLE 9a

Effect of Form of Single-Silica Sources on Zeolite X Yield

| Silica Source | SiO$_2$ Al$_2$O$_3$ | SiO$_2$ in Bodies | SiO$_2$ in Digestion | % NaX 5 hr. Age | % NaX 16 hr. Age | % NaA 5 hr. Age | % NaA 16 hr. Age |
|---|---|---|---|---|---|---|---|
| Na$_2$SiO$_3$ (Grade 40) | 2.96 | — | 0.96 | 24.3 | 21.9 | 15.8 | 21.4 |
| | 2.96 | 0.96 | — | <1 | <1 | <1 | <1 |
| | 3.06 | — | 1.06 | 34.8 | 27.5 | 18.7 | 15.9 |
| | 3.06 | 0.96 | 0.10 | <1 | <1 | <1 | <1 |
| | 3.26 | — | 1.26 | 33.6 | 30.0 | 9.6 | 4.8 |
| | 3.26 | 0.96 | 0.30 | <1 | <1 | <1 | <1 |
| | 3.46 | — | 1.46 | 44.9 | 55.3 | 8.5 | <1 |
| | 3.46 | 0.96 | 0.50 | <1 | <1 | <1 | <1 |
| Colloidal Silica (Ludox LS) | 2.96 | 0.96 | — | 26.5 | 21.8 | 10.5 | 9.6 |
| Fine Particle Silica (Hi-Sil 233) | 2.96 | 0.96 | — | 61.8 | 60.3 | 1 | 1 |
| Large Particle Silica (Snow Floss) | 2.96 | 0.96 | — | 66.0 | 64.1 | <1 | 1 |

TABLE 9b

Effect of Form of Mixed-Silica Sources on Zeolite X Yield

| Silica Source | SiO$_2$ Al$_2$O$_3$ | SiO$_2$ in Bodies* | SiO$_2$ in Digestion** | % NaX 5 hr. Age | % NaX 16 hr. Age | % NaA 5 hr. Age | % NaA 16 hr. Age |
|---|---|---|---|---|---|---|---|
| Na$_2$SiO$_3$ + Ludox LS | 3.06 | 0.96 | 0.10 | 23.0 | 27.6 | 6.8 | 5.3 |
| | 3.26 | 0.96 | 0.30 | 31.5 | 26.9 | <1 | <1 |
| | 3.46 | 0.96 | 0.50 | 30.7 | 33.5 | <1 | <1 |
| Na$_2$SiO$_3$ + Hi-Sil 233 | 3.06 | 0.96 | 0.10 | 61.8 | 66.3 | <1 | <1 |
| | 3.26 | 0.96 | 0.30 | 72.2 | 66.0 | <1 | <1 |
| | 3.46 | 0.96 | 0.50 | 68.7 | 74.2 | <1 | <1 |
| Na$_2$SiO$_3$ + Snow Floss | 3.06 | 0.96 | 0.10 | 67.1 | 73.2 | <1 | <1 |
| | 3.26 | 0.96 | 0.30 | 74.5 | 67.2 | <1 | <1 |
| | 3.46 | 0.96 | 0.50 | 78.2 | 74.2 | <1 | <1 |

*added as colloidal or solid silica
**added as Na$_2$SiO$_3$

The results also demonstrate that, under these conditions, shorter aging times are desirable and may be essential. The solid silica source is typically included in the mixture to be shaped in an amount ranging in value from about five percent (5%) to about twenty percent (20%) by weight dry ingredients for zeolite X and from about eight percent (8%) to about thirty percent (30%) by weight dry ingredients for zeolite Y. For zeolite X the silica in the digestion medium ranges in value from about two percent 2%) to about ten percent (10%) by weight of total aluminosilicate and pore generator and, for zeolite Y, from about three percent (3%) to about fifteen percent (15%) by weight.

d. Wet Strength Enhancing Agent

A particularly novel feature of the process of this invention is the incorporation of a material, designated herein as a wet strength enhancing agent, into the mixture that is shaped into preformed bodies. The principal role of this additive is one of binding the particles of kaolin-type clay in the fired bodies. It eliminates or reduces disintegration of the bodies if they are stored for extended periods of time before digestion. More importantly, this agent renders the bodies more resistant to degradation during the digestion and any aging processes. Particle strength is especially important in those processes, particularly when conducted with agitation.

Suitable materials for use as wet strength enhancing agents are ones which act as binders for the clay particles, which exhibit fine particle size and, as a result, a high surface area, and which will not be destroyed during the calcination process. The preference for binders having a fine particle size arises because adhesion to the clay particles is achieved with a lower dilution effect. An additional unexpected benefit of the small particles is their ability to occupy the smallest pores in the preformed bodies of kaolin-type clay, resulting in a narrower distribution of larger pores available to the caustic digestion medium. Thus, any effect on the rate of conversion caused by the presence of the smallest pores is eliminated or reduced.

In general, clays whose particles are smaller than about one micron in size and which exhibit good binding properties may be used as wet strength enhancing agents in the particle of this invention. Especially effective are the attapulgite clays having the finest particles, such as the commercially available Attagels (Engelhard Corp.) and Min-U-Gels (Floridin Clay Co.). Other fine particle clays of the montmorillonite, sepiolite, palygorskite and kaolinite families are also useful. They may be added in combination and in any amount sufficient to achieve a suitable particle strength without causing the piece density of the fired bodies to deviate from the range of about 1.0 to about 1.3 g/cc, and preferably from about 1.05 to about 1.25 g/cc. Concentrations of about two percent (2%) to about seven percent (7%) by weight of the dry ingredients are preferred, although amounts ranging from about 1% to about 10% by weight may be useful. If the particular clay used as a wet strength enhancing agent is one which is not converted to zeolite during digestion, its alumina and silica contents are not included in determining the composition of the reaction mixture for digestion.

The following examples are given to illustrate the practice of this invention. They are not intended to limit the scope of the appended claims in any way.

EXAMPLE 1

This example demonstrates a prepration of zeolite A from preformed bodies using a cellulose product as a pore generating substance.

A mixture of 4317.7 g coarse kaolinite clay (Hydrite Flat D), 227.2 g attapulgite clay (Attagel-50) and 545.4 g cellulose fibers (Solka-Floc) was blended with 2332.9 g $H_2O$ into a malleable mass and extruded to 1/32 1 inch diameter pellets. After firing at 675° C. for ½ hour, the pellets exhibited a piece density of 1.17 g/cc.

An aging medium was prepared by mixing 811.6 g NaOH (electrolytic grade pellets 97.5% NaOH), 6638.0 g $H_2O$ and 32.8 g $Al_2O_3.3H_2O$. Fired pellets (1136.0 g) prepared as described above were blended with this mixture, and the temperature was raised to 74° C. Over a four hour aging period the temperature was allowed to drop gradually to 65° C. and a mechanical stirrer was periodically activated. Digestion then followed at 90°–98° C. for 6.5 hours with periodic stirring. After the resulting product was washed first with aqueous 1% NaOH and then with $H_2O$, and finally dried, it was found to contain 90.6% zeolite NaA as measured by the McBain oxygen adsorption method.

EXAMPLE 2

This example illustrates a preparation of zeolite A from preformed bodies using a mixture of pure cellulose and fine sawdust as a pore generating material.

Pellets ⅛ inch in diameter were prepared by extruding a mixture of 490.2 g coarse kaolinite clay (Hydrite MP), 25.8 g attapulagite clay (Attagel-50), 30.3 g pure cellulose (Solka-Floc), 51.6 g fine grain sawdust (−100 mesh U.S. Screen) and about 250 g water; the water was added periodically with thorough mixing until the paste was suitable for extrusion. When a small smaple of the paste was ignited, the loss of water (present in the clays and in added form) and organic volatiles was about 45% by weight. The pellets were dried at 100° C. for about 4 hours and then fired at 650° C. for 1 hour.

Conversion to zeolite was accomplished by mixing 23.4 g of the pellets with 18.2 g electrolytic NaOH (about 98% NaOH), 0.8 g $Al_2O_3.3H_2O$ and 118.9 g $H_2O$ and allowing the mixture to stand either at room temperature for sixteen hours and then at 100° C. for eight hours or at 100° C. for 24 hours. After washing and drying the product, the conversion to zeolite A was determined to be 83% as measured by X-ray powder diffraction and 84% by oxygen adsorption in the sixteen hour case and about 80% in the eight hour case.

EXAMPLE 3

This example demonstrates the effect of high piece density on the conversion to zeolite A. The pore generating substances are wheat flour and Solka-Floc.

Two extrusion mixtures were prepared by blending 285 g coarse kaolinite (Hydrite Flat D), 15 g attapulgite clay (Attagel-50) and 18 g wheat flour (Gold Medal All-Purpose Flour) or 18 g pure cellulose (Solka-Floc BW-100) with water until the mixtures were suitable for extrusion; they contained approximately 40% by weight water including the water contained in the clay ingredients. The mixture containing the flour was extruded into 1/32 inch diameter pellets, that containing the Solka-Floc, into 1/64 inch diameter pellets.

The particles were fired for three hours in an oven whose temperature was raised from 150° C. to 700° C. After removal of specimens for X-ray characterization and determination of water content and piece density, the fired particles were transferred to aging media consisting of 135 g distilled $H_2O$, 17.4 g NaOH (reagent grade pellets) and 0.7 g $Al_2O_3.3H_2O$ for each 25 g of fired pellets added. The reaction composition was thus 1.93 $Na_2O$:1.90 $SiO_2$:66.3 $H_2O$:$Al_2O_3$. The mixture containing the 1/32 inch extrudate was digested at 95°–98°– for seventeen hours and then at 90°–110° C. for three hours. The mixture containing the 1/64 inch extrudate was digested at 90°–100° C. for seventeen hours and then at 90°–110° C. for three hours. The resulting products were washed with aqueous 1% NaOH and water at 85°–98° C. and dried overnight at 100° C.

The amount of zeolite A was determined by McBain $O_2$ adsorption analysis. Results are tabulated as follows:

| Extrudate Diameter (in) | Piece Density (g/cc) | % NaA |
|---|---|---|
| 1/32 | 1.78 | 20 |
| 1/64 | 1.61 | 53 |

EXAMPLE 4

The following procedure demonstrates the preparation of zeolite A bodies on a larger scale and with the use of stirred aging and digestion.

A homogeneous mixture of 3453.4 g coarse kaolinite clay (Hydrite Flat D), 181.7 g attapulgite clay (Attagel-50), 472.6 g pure cellulose (Solka-Floc) and 1880.4 g $H_2O$ was extruded into pellets of 1/32 inch diameter. The resulting pellets were dried and then fired at 675° C. for 30 minutes. The piece density of the fired particles was 1.20 g/cc.

Conversion to zeolite was accomplished in less than 24 hours by aging 1136 g of fired pellets for 16.5 hours at 19° C. to 22° C. and then digesting then for 6½ hours at 90° C. to 98° C. in a mixture containing 811.0 g NaOH (electrolytic grade, 97.4%), 32.0 g $Al_2O_3.3H_2O$ powder and 6200.0 g distilled water. The mixture was stirred during aging and digestion according to the following procedure—a stir blade was rotated at 150 rpm continuously during the aging process and then at 200 rpm for one hour and 150 rpm for the next 5.5 hours during digestion.

The product was washed with aqueous 1% NaOH and water, dried and characterized. The zeolite A content was determined to be 88.5% by the McBain oxygen adsorption procedure.

EXAMPLE 5

This example demonstrates the preparation of zeolite X using a preform mixture containing a particulate silica source and a silica-enriched digestion medium.

A mixture containing 222.0 g of coarse kaolinite clay (Hydrite MP), 12.0 g attapulgite clay as a wet strength enhancer (Attagel-50) and 23.4 g of pure cellulose as a pore generator (Solka-Floc BW 100) was mixed with water to form a very thick paste. A silica source was added in the form of 57.3 g particulate diatomaceous earth (Snow Floss, 86.7% $SiO_2$, 3.3% unreactive alumina), and water was added to render the paste extrudable. The extruded pellets, having a diameter of ⅛ inch, were dried at 100° C. overnight and then fired at 650° C. for 2.5 hours.

The medium for aging and digestion was prepared by mixing 23.4 g of the fired pellets, 21.4 g NaOH, 6.2 g sodium silicate (Grade 40) and 148.3 g water. After aging at room temperature for five hours, digestion at 100° C. for sixteen hours produced bodies which, after washing and drying at 100° C., had a zeolite X content of 77.9% by weight and 88.4% by weight as measured by X-ray powder diffraction and $O_2$ adsorption respectively.

EXAMPLE 6

This example illustrates the preparation of zeolite X using preformed bodies containing a particulate silica source, crystals of zeolite X and a silica-enriched digestion medium.

A mixture of 429.7 g kaolinite clay (Hydrite Flat D), 24.0 g attapulgite clay (Attagel-50), and 58.5 g pure cellulose (Solka-Floc) was thoroughly mixed. After 110.7 g diatomaceous earth (Snow Floss) as a silica source and 21.5 g of NaX zeolite crystals were blended into the mixture, water was mixed in until the consistency of the paste permitted extrusion of particles having a 1/16 inch diameter. The extrudates were dried at 100° C. overnight and then fired at 650° C. for 2.5 hours.

A mixture containing 11.7 g of the resulting pellets, 10.7 g NaOH, 3.1 g $Na_2SiO_3$ and 74.1 g $H_2O$ was aged at room temperature for eight hours with occasional stirring and then digested at 100° C. for twenty hours with occasional stirring. The product was washed, dried and analyzed for NaX content. Values of 70, 86 and 87% by weight NaX were obtained by X-ray powder diffraction, oxygen adsorption and water adsorption measurements respectively.

EXAMPLE 7

This example describes the preparation of zeolite X from a preform containing a particulate silica source and added zeolite X crystals by using a short aging time, an extended digestion time and a silica-enriched digestion medium.

A mixture of 429.7 g kaolinite clay (Hydrite Flat D), 24.0 g attapulgite clay (Attagel-50), and 58.5 g pure cellulose (Solka-Floc) was thoroughly mixed. After 110.7 g diatomaceous earth (Snow Floss) and 21.5 g of NaX zeolite crystals were blended into the mixture, water was mixed in until the consistency of the paste permitted extrusion of particles having a 1/16 inch diameter. The extrudates were dried at 100° C. overnight and then fired at 650° C. for 2.5 hours.

Conversion to zeolite X took place in a medium consisting of 11.7 g of the fired pellets, 10.7 g NaOH (97.4% purity), 3.1 g $Na_2SiO_3$ (Grade 40) and 74.1 g $H_2O$.

Aging at room temperature for two hours was followed by digestion at 100° C. for sixteen hours. There was no agitation during either step. The product was washed and dried. Analyses for zeolite X content showed 83, 83 and 84% by weight as determined by X-ray diffraction, $O_2$ adsorption and water adsorption measurement respectively.

What is claimed is:

1. A method of preparing molecular sieves of the zerolite type in massive bodies which comprises digesting in the presence of alkali metal oxide massive preformed or shaped bodies, which contain reactive clay and which are prepared from particles of non-reactive clay, in which at least fifty weight percent (50%) of the particles range in size from about 1.5 to about 15 microns, until said reactive clay is substantially converted to crystalline zeolite.

2. A method according to claim 1 wherein said reactive clay is metakaolin or metahalloysite.

3. A method according to claim 1 wherein at least fifty weight percent (50%) of the particles in said clay range in size from about 2 to about 10 microns.

4. A method of preparing molecular sieves of the zeolite type in massive bodies which comprises:
   a. forming into massive preformed or shaped bodies a mixture comprising:
      i. non-reactive clay in which at least fifty weight percent (50%) of the particles range in size from about 1.5 to about 15 microns;
      ii. pore generating material in sufficient quantity to provide substantial porosity in said shaped bodies after thermal treatment; and
      iii. water in sufficient quantity to provide plasticity;
   b. thermally treating said shaped bodies at a temperature and for a time sufficient to:
      i. convert said non-reactive clay to a reactive form; and
      ii. generate substantial porosity in said shaped bodies by destroying substantially all of said pore generating material; and
   c. digesting in the presence of aqueous alkali metal oxide said thermally treated shaped bodies until said reaction form of clay is substantially converted to pure crystalline zeolite.

5. A method according to claim 4 wherein said clay is kaolinite or halloysite.

6. A method according to claim 4 wherein at least fifty weight percent (50%) of the particles in said clay range in size from about 2 to about 10 microns.

7. A method according to claim 4 wherein said pore generating material is present at a level of from about one percent (1%) to about twenty-five percent (25%) by weight relative to said clay.

8. A method according to claim 7 wherein said pore generating material is present at a level of from about two percent (2%) to about thirteen percent (13%) by weight.

9. A method according to claim 4 wherein said pore generating material is selected from the group consisting of sawdust, powdered carbon, coke, lampblack, cellulose products, starches, hydrocarbon polymer fibers, and polymeric materials containing hydrogen, carbon and oxygen.

10. A method according to claim 9 wherein said pore generating material is smaller than about 149 microns.

11. A method according to claim 4 wherein said mixture contains from about thirty-five percent (35%) to about forty-five percent (45%) by weight water.

12. A method according to claim 11 wherein said mixture contains from about thirty-eight percent (38%) to about forty-two percent (42%) by weight water.

13. A method according to claim 4 wherein said mixture comprises: (a) from about fifty-five percent (55%) to about sixty-five percent (65%) by weight of a dry mixture containing from about seventy percent (70%) to about ninety percent (90%) clay and from about two percent (2%) to about twenty percent (20%) pore generating material; and (b) from about thirty-five percent (35%) to about forty-five percent (45%) by weight water.

14. A method according to claim 13 wherein said thermally treated shaped bodies exhibit a piece density of from about 1.0 to about 1.3 g/cc.

15. A method according to claim 14 wherein said piece density ranges in value from about 1.05 to about 1.25 g/cc.

16. A method according to claim 4 wherein said mixture comprises a wet strength enhancing agent selected from clays selected from the group consisting of attapulgite, montmorillonite, halloysite, sepiolite, palygorskite and kaolinite, whose particles are smaller than about one micron in size and which exhibit binding properties for clay particles, which is present as from about one percent (1%) to about ten percent (10%) by weight.

17. A method according to claim 16 wherein said wet strength enhancing agent is present as from about two percent (2%) to about seven percent (7%) by weight.

18. A method according to claim 4 wherein said mixture is formed into shaped bodies by extruding, spray drying, prilling, molding, casting, slip casting, tableting, briquetting, or bead forming methods selected from the group consisting of tumbling, drum rolling, Nauta mixing and disk forming.

19. A method according to claim 18 wherein said mixture is formed into shaped bodies by extruding, spray drying, prilling or bead forming.

20. A method according to claim 4 wherein said mixture further comprises from about one percent (1%) to about forthy percent (40%) by weight reactive clay or zeolite particles.

21. A method of preparing molecular sieves of zeolite A in massive bodies which comprises:
   a. forming into massive preformed or shaped bodies a mixture comprising:
      i. non-reactive clay in which at least fifty weight percent (50%) of the particles range in size from about 1.5 to about 15 microns;
      ii. pore generating material in sufficient quantity to provide substantial porosity in said shaped bodies after thermal treatment; and
      iii. water in sufficient quantity to provide plasticity;
   b. thermally treating said shaped bodies at a temperature and for a time sufficient to:
      i. convert said non-reactive clay to a reactive form; and
      ii. generate substantial porosity in said shaped bodies by destroying substantially all of said pore generating material; and
   c. digesting said thermally treated shaped bodies in an aqueous alkaline reaction medium whose overall composition, including both solid and liquid phases, may be approximately expressed in terms of mole ratio of oxides as:

$M_2O/SiO_2 = 0.5 - 1.5$ $SiO_2/Al_2O_3 1.6 - 2.2$ $H_2O/M_2O = 10 - 100$ until said reactive form of clay is substantially converted to crystalline zeolite A.

22. A method according to claim 21 wherein said mixture to be shaped further comprises a wet strength enhancing agent selected from clays selected from the group consisting of attapulgite, montmorillonite, halloysite, sepiolite, palygorskite and kaolinite, whose particles are smaller than about one micron in size and which exhibit binding properties for clay particles, which is present in an amount in value from about one percent (1%) to about ten percent (10%) by weight of dry ingredients.

23. A method according to claim 22 wherein said wet strength enhancing agent is present in an amount of from about two percent (2%) to about seven percent (7%) by weight.

24. A method according to claim 21 wherein said pore generating material is selected from the group consisting of sawdust, powdered carbon, coke, lampblack, cellulose products, starches, hydrocarbon polymer fibers and polymeric materials containing hydrogen, carbon and oxygen.

25. A method according to claim 21 wherein said mixture comprises: (a) from about fifty-five percent (55%) to about sixty-five percent (65%) by weight of a dry mixture containing from about seventy percent (70%) to about ninety percent (90%) clay, from about two percent (2%) to about fifteen percent (15%) pore generating material, and from about two percent (2%) to about seven percent (7%) wet strength enhancing agent; and (b) from about thirty-five percent (35%) to about forty-five percent (45%) by weight water.

26. A method of preparing molecular sieves of zeolite X in massive bodies which comprises:
   a. forming into massive preformed or shaped bodies a mixture comprising:
      i. non-reactive clay in which at least fifty weight percent (50%) of the particles range in size from about 1.5 to about 15 microns;
      ii. pore generating material in sufficient quantity to provide substantial porosity in said shaped bodies after thermal treatment; and
      iii. water in sufficient quantity to provide plasticity;
   b. thermally treating said shaped bodies at a temperature and for a time sufficient to:
      i. convert said non-reactive clay to a reactive form; and
      ii. generate substantial porosity in said shaped bodies by destroying substantially all of said pore generating material; and
   c. digesting said thermally treated shaped bodies in an aqueous alkaline reaction medium whose overall composition, including liquid and solid phases, may be approximately expressed, in terms of mole ratio of oxides as:

$M_2O/SiO_2 = 0.8 - 1.5$ $SiO_2/Al_2O_3 = 2.5 - 5$ $H_2O/M_2O = 25 - 60$ until said reactive form of clay is substantially converted to crystalline zeolite X.

27. A method according to claim 26 wherein said mole ratio of $SiO_2/Al_2O_3$ is achieved by addition of a silica source to the mixture to be shaped.

28. A method according to claim 27 wherein said silica source is selected from the group consisting of colloidal silica sol, silicic acid, alkali metal silicate, silica gel and reactive particulate silica.

29. A method according to claim 26 wherein said mole ratio of $SiO_2/Al_2O_3$ is achieved by addition of a silica source to the liquid phase of said reaction medium of step c.

30. A method according to claim 29 wherein said silica source is selected from the group consisting of colloidal silica sol, silicic acid, alkali metal silicate, silica gel or reactive particulate silica.

31. A method according to claim 26 wherein said mole ratio of $SiO_2/Al_2O_3$ is achieved by addition of a silica source to both said mixture to be shaped and to said reaction medium.

32. A method according to claim 31 wherein said silica source is selected from the group consisting of colloidal silica sol, silicic acid, alkali metal silicate, silica gel and reactive particulate silica.

33. A method according to claim 26 wherein said mixture to be shaped further comprises a wet strength enhancing agent selected from clays selected from the group consisting of attapulgite, montmorillonite, halloysite, sepiolite, palygorskite and kaolinite, whose particles are smaller than about one micron in said and which exhibit binding properties for clay particles, which is present in an amount ranging in value from about one percent (1%) to about ten percent (10%) by weight of dry ingredients.

34. A method according to claim 26 wherein said mixture to be shaped further comprises from about one percent (1%) to about forty percent (40%) by weight reactive clay or zeolite particles.

35. A method according to claim 26 wherein said mixture to be shaped further comprises from about five percent (5%) to about twenty percent (20%) by weight colloidal, solid or reactive particulate silica.

36. A method according to claim 26 wherein said reaction medium for digestion contains alkali metal silicate in an amount ranging in value from about two percent (22%) to about ten percent (10%) by weight of total aluminosilicate and pore generator.

37. A method according to claim 26 wherein said pore generating material is selected from the group consisting of sawdust, powdered carbon, coke, lampblack, cellulose products, starches, hydrocarbon polymer fibers and polymeric materials containing hydrogen, carbon and oxygen.

38. A method according to claim 26 wherein said mixture to be shaped comprises: (a) from about fifty-five percent (55%) to about sixty-five percent (65%) by weight of a dry mixture containing from about seventy percent (70%) to about ninety percent (90%) clay, from about three percent (3%) to about twenty percent (20%) pore generating material, from about two percent (2%) to about seven percent (7%) wet strength enhancing agent, and from about five percent (5%) to about twenty percent (20%) colloidal, solid or reactive particulate silica; and (b) from about thirty-five percent (35%) to about forty-five percent (45%) by weight water.

39. A method of preparing molecular sieves of zeolite Y in massive bodies which comprises:

a. forming into massive preformed or shaped bodies a mixture comprising:
  i. non-reactive clay in which at least fifty weight percent (50%) of the particles range in size from about 1.5 to about 15 microns;
  ii. pore generating material in sufficient quantity to provide substantial porosity in said shaped bodies after thermal treatment; and
  iii. water in sufficient quantity to provide plasticity;
b. thermally treating said shaped bodies at a temperature and for a time sufficient to:
  i. convert said non-reactive clay to a reactive form; and
  ii. generate substantial porosity in said shaped bodies by destroying substantially all of said pore generating material; and
c. digesting said thermally treated shaped bodies in an aqueous alkaline reaction medium whose overall composition, including liquid and solid phases, may be approximately expressed, in terms of mole ratio of oxides, as:

$$M_2O/SiO_2 = 0.3 - 0.6$$

$$SiO_2/Al_2O_3 = 6 - 9$$

$$H_2O/M_2O = 35 - 50$$

until said reactive form of clay is substantially converted to crystalline zeolite Y.

40. A method according to claim 39 wherein said mole ratio of $SiO_2/Al_2O_3$ is achieved by addition of a silica source to the mixture to be shaped.

41. A method according to claim 40 wherein said silica source is selected from the group consisting of colloidal silica sol, silicic acid, alkali metal silicate, silica gel and reactive particulate silica.

42. A method according to claim 39 wherein said mole ratio of $SiO_2/Al_2O_3$ is achieved by addition of a silica source to the liquid phase of said reaction medium of step c.

43. A method according to claim 42 wherein said silica source is selected from the group consisting of colloidal silica sol, silicic acid, alkali metal silicate, silica gel and reactive particulate silica.

44. A method according to claim 39 wherein said mole ratio of $SiO_2/Al_2O_3$ is achieved by addition of a silica source to both said mixture to be shaped and to said reaction medium.

45. A method according to claim 44 wherein said silica source is selected from the group consisting of colloidal silica sol, silicic acid, alkali metal silicate, silica gel and reactive particulate silica.

46. A method according to claim 39 wherein said mixture to be shaped further comprises a wet strength enhancing agent selected from clays selected from the group consisting of attapulgite, montmorillonite, halloysite, sepiolite, palygorskite and kaolinite, whose particles are smaller than about one micron in size and which exhibit binding propoerties for clay particles, which is present in an amount ranging in value from about one percent (1%) to about ten percent (10%) by weight of dry ingredients.

47. A method according to claim 39 wherein said mixture to be shaped further comprises from about one percent (1%) to about forty percent (40%) by weight reactive clay or zeolite particles.

48. A method according to claim 39 wherein said mixture to be shaped further comprises from about eight percent (8%) to about thirty percent (30%) by weight solid silica source.

49. A method according to claim 39 wherein said reaction medium for digestion contains alkali metal silicate in an amount ranging in value from about three percent (3%) to about fifteen percent (15%) by weight of total aluminosilicate and pore generator weight.

50. A method according to claim 39 wherein said pore generating material is selected from the group consisting of sawdust, powdered carbon, coke, lampblack, cellulose products, starches, hydrocarbon polymer fibers and polymeric materials containing hydrogen, carbon and oxygen.

51. A method according to claim 39 wherein said mixture to be shaped comprises: (a) from about fifty-five percent (55%) to about sixty-five percent (65%) by weight of a dry mixture containing from about seventy percent (70%) to about ninety percent (90%) clay, from about three percent (3%) to about twenty percent (20%) pore generating material, from about two percent (2%) to about seven percent (7%) wet strength enhancing agent, and from about eight percent (8%) to about thirty percent (30%) colloidal, solid or reactive particulate silica; and (b) from about thirty-five percent (35%) to about forty-five percent (45%) by weight water.

52. A method of preparing molecular sieves of the zeolite type in massive bodies, which method comprises:
   a. forming into massive preformed or shaped bodies a mixture comprising:
      i. non-reactive clay;
      ii. pore generating material in sufficient quantity to provide substantial porosity in said shaped bodies during digestion, wherein said material is water soluble after the thermal treatment in step b below; and
      iii. water in sufficient quantity to provide plasticity;
   b. thermally treating said shaped bodies at a temperature and for a time sufficient to convert said clay to a reactive form; and
   c. digesting said thermally treated shaped bodies in an aqueous alkaline medium under conditions of time, temperature and concentration sufficient to convert substantially all of said reactive form of clay into crystalline zeolite.

53. A method according to claim 52 wherein said pore generating material is selected from the group consisting of the water-soluble carbonates, bicarbonates, phosphates, chlorides, nitrates, sulfates and acetate salts of alkali metals, alkaline earths, transition metals, rare earth metals, ammonium and aluminum.

54. A method according to claim 52 wherein said pore generating material is present in an amount ranging in value from about three percent (3%) to about twenty percent (20%) by weight of the dry ingredients in said mixture.

55. A method of preparing molecular sieves of the zeolites A, X, and Y in massive bodies which comprises:
   a. forming into massive preformed or shaped bodies a mixture comprising:
      i. non-reactive clay in which at least fifty weight percent (50%) of the particles range in size from about 1.5 microns to about 15 microns;
      ii. pore generating material in sufficient quantity to provide substantial porosity in said shaped bodies during digestion; and
      iii. water in sufficient quantity to provide plasticity;
   b. thermally treating said shaped bodies at a temperature and for a time sufficient to convert said clay to a reactive form; and
   c. digesting said thermally treated shaped bodies in an aqueous alkaline medium whose overall composition, including both solid and liquid phases, may be approximately expressed in terms of moles of oxide by the values given in Table 1 at a temperature and for a time sufficient to convert substantially all of said reactive form of clay to crystalline zeolite.

56. A method according to claim 55 wherein said pore generating material is a material that is water soluble after said thermal treatment.

57. A method according to claim 56 wherein said pore generating material is selected from the group consisting of the carbonate, bicarbonate, phosphate, chloride, nitrate, sulfate and acetate salts of alkali metals, alkaline earths, transition metals, rare earth metals, ammonium and aluminum.

58. A method according to claim 55 wherein said pore generating material is present in an amount ranging in value from about three percent (3%) to about twenty percent (20%) by weight of the dry ingredients in said mixture.

59. A method according to claim 52 wherein said mixture further comprises a wet-strength enhancing agent selected from clays selected from the group consisting of attapulgite, montmorillonite, halloysite, sepiolite, palygorskite andkaolinite, whose particles are smaller than about one micron in size and which exhibit binding properties for clay particles.

60. A method according to claim 55 wherein said mixture further comprises a wet-strength enhancing agent selected from clays selected from the group consisting of attapulgite, montmorillonite, halloysite, sepiolite, palygorskite and kaolinite, whose particles are smaller than about one micron in size and which exhibit binding properties for clay particles, which is present in an amount ranging in value from about one percent (1%) to about ten percent (10%) by weight of dry ingredients.

61. A method according to claim 1 wherein said clay has the general formula $$Al_2O_3.2SiO_2.2-4H_2O.$$

62. A method according to claim 28 wherein a colloidal silica sol and a reactive particulate silica are added to said mixture to be shaped.

63. A method according to claim 32 wherein a colloidal silica sol and a reactive particulate silica are added to said mixture to be shaped and an alkali metal silicate is added to said reaction medium.

64. A method according to claim 41 wherein a colloidal silica sol and a reactive particulate silica are added to said mixture to be shaped.

65. A method according to claim 46 wherein a colloidal silica sol and a reactive particulate silica are added to said mixture to be shaped and an alkali metal silicate is added to said reaction medium.

66. A method of preparing molecular sieves of the zeolite type in massive bodies which comprises:
   a. forming into massive preformed or shaped bodies a mixture comprising:

i. non-reactive clay having the general formula $Al_2O_3 \cdot SiO_2 \cdot 2\text{-}4H_2O$ in which at least fifty weight percent (50%) of the particles range in size from about 2 to about 10 microns;
ii. a wet strength enhancing agent comprising an attapulgite clay whose particles are small than about one micron in size;
iii. pore generating materials in sufficient quantity to provide substantial porosity in said shaped bodies after thermal treatment; and
iv. water in sufficient quantity to provide plasticity;
b. thermally treating said shaped bodies at a temperature and for a time sufficient to:

i. convert said non-reactive clay to an amorphous reactive form which can be converted to crystalline aluminosilicates of the zeolite type; and
ii. generate substantial porosity in said shaped bodies by destroying substantially all of said pore generating material; and
c. digesting in the presence of aqueous alkali metal oxide said thermally treated shaped bodies until said reactive form of clay is substantially converted to pure crystalline zeolite.

67. A method according to claim 67 wherein said mixture of a. further comprises pore generating material which is water soluble after said thermal treatment and thus provides additional porosity in said shaped bodies during the digestion of c.

* * * * *